US007454519B2

(12) United States Patent
Smith et al.

(10) Patent No.: US 7,454,519 B2
(45) Date of Patent: Nov. 18, 2008

(54) METHOD FOR AUTOMATICALLY ALLOCATING ADDRESS PREFIXES

(75) Inventors: Aaron N. Smith, Streamwood, IL (US); Gregory W. Cox, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 1559 days.

(21) Appl. No.: 10/104,862

(22) Filed: Mar. 22, 2002

(65) Prior Publication Data

US 2003/0182445 A1    Sep. 25, 2003

(51) Int. Cl.
    *G06F 15/173*    (2006.01)
(52) U.S. Cl. .................. 709/238; 709/245; 370/229; 370/351
(58) Field of Classification Search .............. 709/245, 709/238; 370/229, 351, 392, 395.52, 401, 370/393; 712/300
    See application file for complete search history.

(56) References Cited

U.S. PATENT DOCUMENTS

| | | | |
|---|---|---|---|
| 5,805,594 | A | 9/1998 | Kotchey et al. |
| 6,011,795 | A | 1/2000 | Varghese et al. |
| 6,130,892 | A | 10/2000 | Short et al. |
| 6,167,052 | A | 12/2000 | McNeill et al. |
| 6,178,455 | B1 | 1/2001 | Schutte et al. |
| 6,201,088 | B1 | 3/2001 | Gruber et al. |
| 6,430,527 | B1 | 8/2002 | Waters et al. |
| 2002/0024965 | A1 | 2/2002 | Lee |

OTHER PUBLICATIONS

Peter Loshin, "IPv6 Clearly Explained," Morgan Kaufmann Publishers, Inc., San Francisco, California, Copyright 1999 by Academic Press, pp. 98, 100, 173-181.
Ralph Droms and Ted Lemon, "The DHCP Handbook: Understanding, Deploying, and Managing Automated Configuration Services," Macmillan Technical Publishing, Indianapolis, Indiana, Copyright 1999 by Ralph Droms and Edward W. Y. Lemon, III, p. 68.
Sidarth Ambardar and Walter Lazear, "Dynamic Router Configuration Management for Wireless Mobile Environments," RAWCON'98 Proceedings, 0-7803-4988-1/98, Copyright 1998 IEEE, pp. 31-34.
S. Deering and R. Hinden, "Internet Protocol, Version 6 (IPv6) Specification," The Internet Society-Network Working Group (RFC 2460, Dec. 1998).
T. Narten et al., "Neighbor Discovery for IP Version 6 (IPv6)," The Internet Society-Network Working Group (RFC 2461, Dec. 1998).
S. Thomson and T. Narten, "IPv6 Stateless Address Autoconfiguration," The Internet Society-Network Working Group (RFC 2462, Dec. 1998).

(Continued)

*Primary Examiner*—Saleh Najjar
*Assistant Examiner*—Faruk Hamza (57) ABSTRACT

As routers (15) are added to an existing network (41), links serviced by such routers that lack a pre-existing corresponding address prefix may occur. The router (15) can contact a prefix server (14) and engage in a process to automatically receive a new address prefix from the prefix server (14) to use with such links. In one embodiment, the prefix server (14) can automatically assign such address prefixes to form or maintain an aggregation of routes to facilitate the efficient operation of routers within the network and overall network growth.

19 Claims, 7 Drawing Sheets

OTHER PUBLICATIONS

Peter Loshin, "IPv6 Clearly Explained," Morgan Kaufmann Publishers, Inc., San Francisco, California, Copyright 1999 by Academic Press, pp. 98, 100, 173-181.

Ralph Droms and Ted Lemon, "The DHCP Handbook: Understanding, Deploying, and Managing Automated Configuration Services," Macmillan Technical Publishing, Indianapolis, Indiana, Copyright 1999 by Ralph Droms and Edward W. Y. Lemon, III, p. 68.

Sidarth Ambardar and Walter Lazear, "Dynamic Router Configuration Management for Wireless Mobile Environments," RAWCON'98 Proceedings, 0-7803-4988-1/98, Copyright 1998, IEEE, pp. 31-34.

S. Deering and R. Hinden, "Internet Protocol, Version 6 (IPv6) Specification," The Internet Society-Network Working Group (RFC 2460, Dec. 1998).

T. Narten et al., "Neighbor Discovery for IP Version 6 (IPv6)," The Internet Society-Network Working Group (RFC 2461, Dec. 1998).

S. Thomson and T. Narten, "IPv6 Stateless Address Autoconfiguration," The Internet Society-Network Working Group (RFC 2462, Dec. 1998).

METHOD FOR AUTOMATICALLY ALLOCATING ADDRESS PREFIXES

TECHNICAL FIELD

This invention relates generally to routers and more particularly to address prefixes as used by routers.

BACKGROUND

Network routers are well understood in the art and ordinarily function to forward messages to and/or from other hosts and routers. A router generally has two or more network interfaces into which connections to a link can be coupled. A link may typically comprise several devices interconnected by a networking hub such as an Ethernet hub. A router receives packets of information on these connections and retransmits them through other network interfaces according to decisions it makes about which packets to retransmit and which interface on which to retransmit those packets. Routers are used to connect networks, such as local area networks and the Internet, to each other.

The IETF's IPv6 (Internet Protocol version 6) is a newly developing network protocol intended, in part, to better accommodate numerous wireless endpoints (one good reference defining IPv6 is the text "IPv6 Clearly Explained" by Pete Loshin© 1999 by Academic Press and published by Morgan Kaufmann, San Francisco). Adding routers to an existing IPv6 system presents sometimes challenging logistic requirements. One of these challenges concerns address prefixes (Figures 6.2 on page 98 and 6.3 on page 100 of the Loshin reference noted above provide examples of prefixes for IPv6. In the case of Figure 6.3, the fields to the left of the Interface ID comprise the prefix.). When connecting a new router into such a system context, address prefixes may already exist for some of the links connected to the router's interfaces while other links may not have address prefixes available. Unfortunately, assigning new address prefixes without care can cause routers to operate inefficiently, requiring larger routing tables and consuming more central processing unit cycles to make routing decisions than would be necessary if address prefix assignments were made judiciously. Router operations are generally more efficient when address prefixes are assigned to preserve at least some degree of aggregation with respect to various routes within a given network. Identifying an appropriate address prefix to assign to such a link therefore often requires human intervention. This can detrimentally impact overhead cost and cycle time issues and further introduces an opportunity for human error.

The IPv6 protocol family anticipates some logistics issues in that endpoints are specifically anticipated to be self-configuring. Unfortunately, routers are excluded from these particular provisions (see, for example, section 1 of IETF RFC 2462, "IPv6 Stateless Address Autoconfiguration"). Consequently, the protocol itself offers no particular assistance in this regard. Suggestions have been presented that so-called self-discovering networks could alleviate such concerns, but the applicants are unaware of any applicable and enabled network of this nature.

BRIEF DESCRIPTION OF THE DRAWINGS

The above needs are at least partially met through provision of the method for automatically allocating address prefixes described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

Generally speaking, pursuant to these various embodiments, a prefix server has a plurality of unassigned address prefixes suitable for use within a given communications network. From time to time, a router will request assignment of a new address prefix to use with a given link. The prefix server will assign a new address prefix to that requesting router to use with that link as appropriate. In one embodiment, the prefix server will assign a new address prefix by selecting an address prefix from amongst the plurality of unassigned address prefixes that preserves, to at least some extent, a routing aggregation that includes a route to the link for which the new address prefix will be used. In one embodiment, when no such assignment that preserves routing aggregation can be made (notwithstanding a general availability of one or more unassigned address prefixes), the prefix server can refuse to assign a new address prefix. Pursuant to another embodiment, the prefix server can reassign previously assigned address prefixes to thereby make available an address prefix that can be assigned while also preserving a routing aggregation. To support these embodiments, the prefix server can have access to topological information regarding location of various network elements and/or their corresponding addresses/address prefixes. Such topological information can be used to inform the selection and assignment activity with respect to forming and/or preserving an aggregation.

Figure 1:
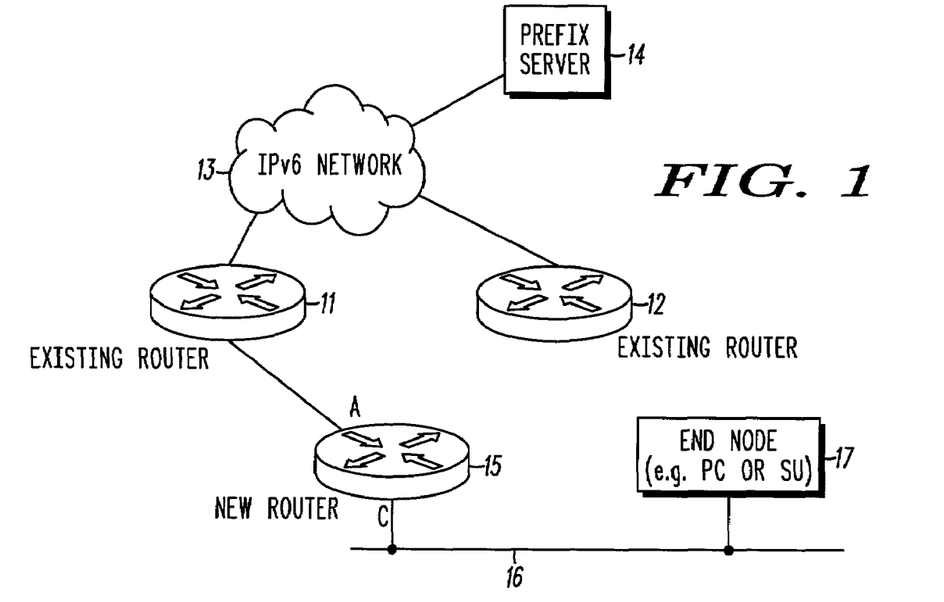
FIG. 1 illustrates a new router supporting a new link being added to an existing network.

FIG. 1 depicts an example scenario where these approaches find use. Existing routers 11 and 12 are coupled to a network 13 (in this example, an IPv6 compliant network), which network also couples to a prefix server 14. The prefix server 14 comprises a server having stored in local memory (or having access to remotely stored) unassigned address prefixes. These address prefixes preferably comprise either sequentially numbered address prefixes or at least address prefixes having one or more prefixes that share at least some most significant address bits (either as amongst themselves and/or with already assigned address prefixes within the network in question) (certain benefits of these embodiments can be realized without making this provision, but, generally speaking, assignments to support aggregation can be more readily assured by providing such unassigned address prefixes).

When a new router 15 is coupled within a given network to the existing router 11, the existing router 11 will provide advertisements that provide existing address prefix information (as described in IETF RFC 2461, "Neighbor Discovery for IP Version 6") that are received on the new router's 15 interface (labeled "A" in FIG. 1). The new router's "C" interface, however, in this example connects to a link 16 that has no other routers attached (notwithstanding that other devices 17 may likely be attached to the link 16). In this example, the new router 15 needs an address prefix assigned for use with this link 16 (in a related patent application Ser. No. 09/996,208 entitled Method and Apparatus for Self-Link Assessing Router, the inventors hereof have described a method by which such a router can automatically itself ascertain that a new address prefix is needed in such a situation). Pursuant to the teachings below, the prefix server 14 can be utilized to effect the automatic assignment of such a new address prefix.

Figure 2:
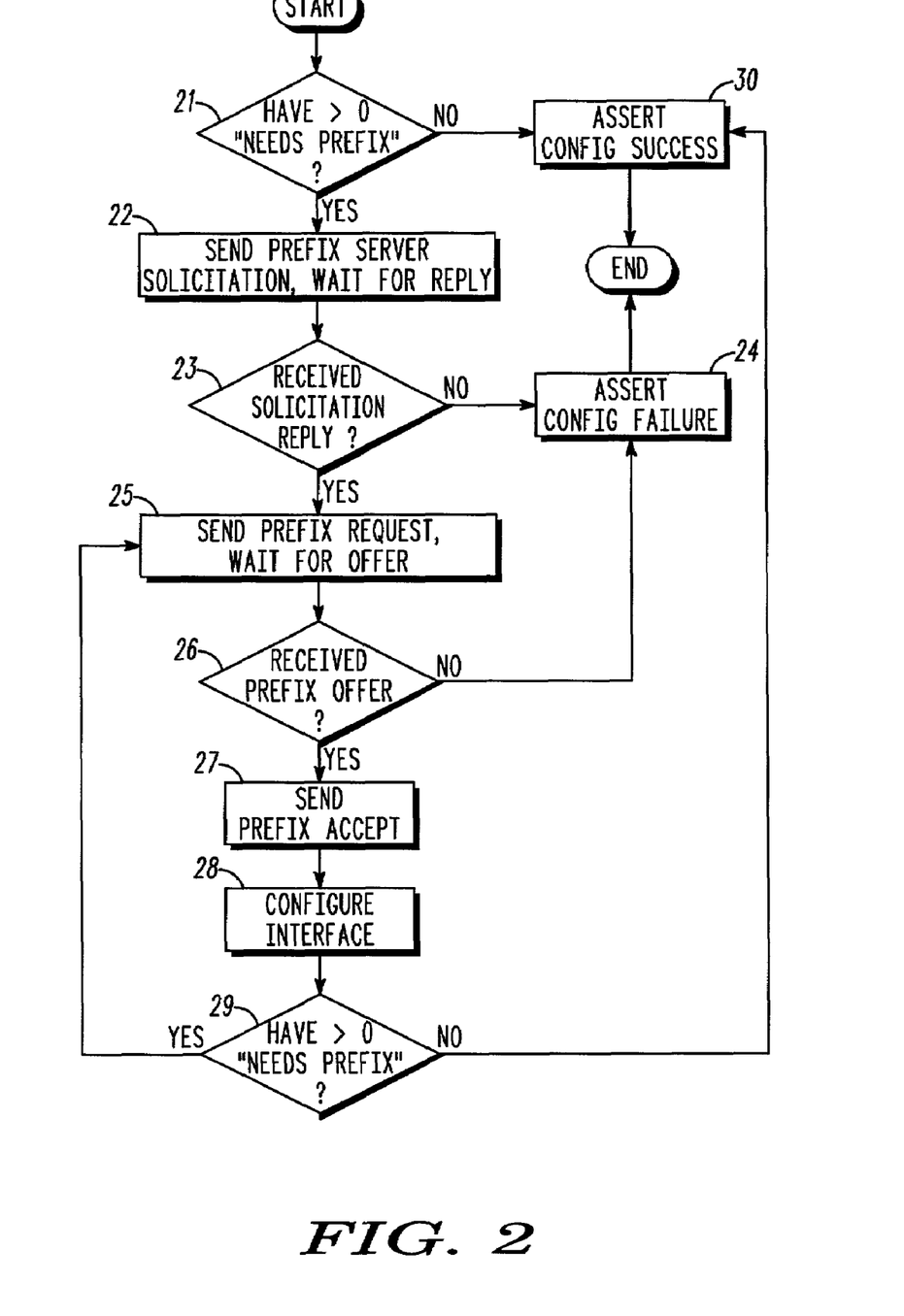
FIG. 2 illustrates one embodiment whereby a router can interact with a prefix server to obtain a new address prefix.

FIG. 2 depicts a flow diagram of one embodiment of a process that the new router 15 can use to interact with the prefix server 14 to obtain an IPv6 prefix and thereby configure its "C" interface accordingly. Upon identifying 21 a need for a new address prefix, the router solicits 22 the prefix server 14 and waits for a response (ordinarily, the router will only wait for a predetermined period of time as determined through use of a static time out mechanism or a time out mechanism having a dynamic duration). If no response to the solicitation can be identified 23, configuration failure 24 results. Upon receiving a response, however, the router sends 25 a prefix request to the prefix server. Again, the router will wait for a response from the prefix server, this time in the form of an offer, and again, if no response is detected 26, a configuration failure will again be asserted 24. When a new prefix offer is detected 26, however, the router accepts 27 the prefix and configures 28 the appropriate router interface (such as interface "C" in the example above) for use with the link 16 in question. (Note that such configuration will ordinarily comprise auto-configuration; that is, using a stateless address auto-configuration method for hosts as established in IETF RFC 2462 to establish an address for the interface having the newly accepted address prefix, and such configuration will also ordinarily comprise advertising the address prefix on the link as established in IETF RFC 2461. Note also that the new router must also be preconfigured to participate in whatever IPv6 routing protocol (such as RIPng for IPv6 or OSPFv6) the other routers in the network are using. In this way, the new router will exchange routing information with existing routers so that hosts on a new link served by a new router will be able to communicate with hosts on other links in the network.) If the router determines 29 that it still has additional need for one or more new prefixes, the process returns to source 25 another prefix request and the process continues as described above. When all new address prefixes as needed have been acquired in this fashion, configuration success can be asserted 30 and the process concludes. So configured, the router can request and obtain one or more new address prefixes to support one or more links.

Figure 3:
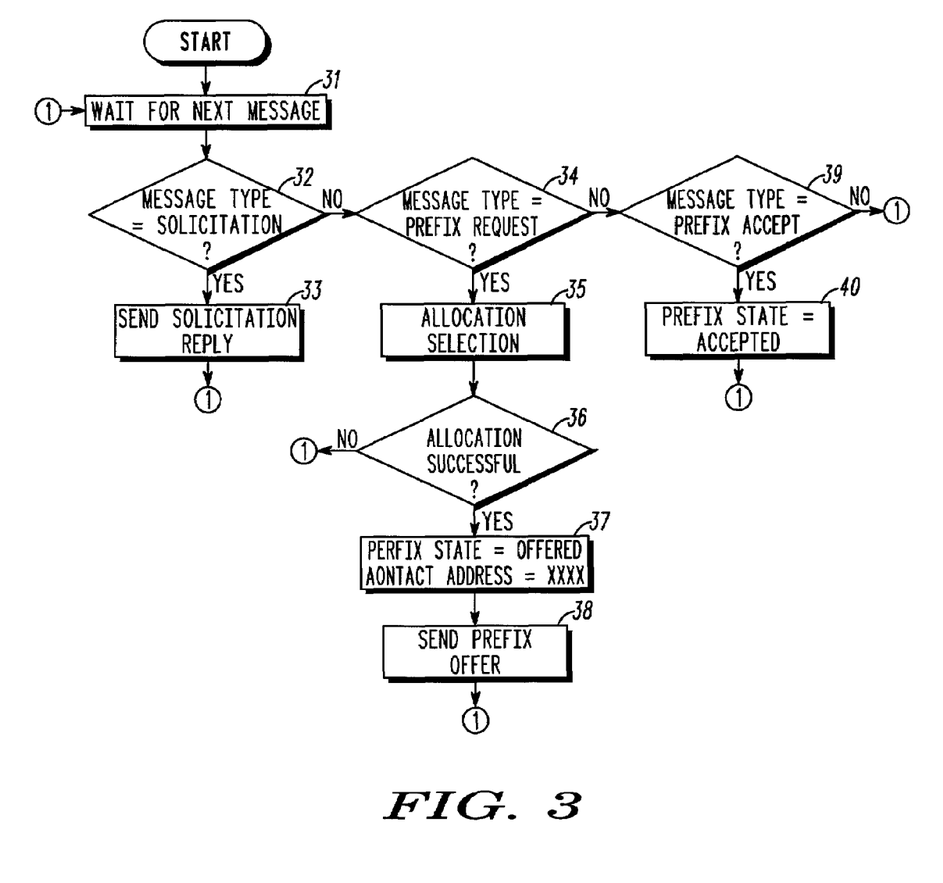
FIG. 3 illustrates one embodiment whereby a prefix server can interact with a router to assign a new address prefix.

FIG. 3 depicts a flow diagram of a process that the prefix server 14 can use for interacting with a router to allocate a prefix. (Again, it is assumed that the prefix server 14 is preconfigured with a pool of prefixes and further that the prefix server 14 is authoritative regarding allocation of such prefixes.) Upon receiving a message 31 from a router, the prefix server 14 determines 32 whether the message constitutes a prefix server solicitation as mentioned above. When true, the prefix server 14 sends 33 a solicitation reply to indicate a general availability and presence to the requesting router. When false (meaning the message is not determined 32 to be a solicitation), the prefix server 14 next determines 34 if the message constitutes a prefix request from the router. When true, meaning a router is requesting a new address prefix, the prefix server 14 processes 35 an allocation selection process (or processes) of choice.

In this embodiment, if the prefix server 14 determines 36 that a new prefix cannot be successfully selected (for example, there are no prefixes available to assign, or the prefixes available to assign will not support an appropriate aggregation of routes) the process will conclude. As an alternative, a message can be sent to the requesting router to indicate that no assignment can be made at this time. When the prefix server 14 determines 36, however, that a prefix has been successfully selected, the prefix server 14 will update 37 internal records to indicate the "offered" state of the selected address prefix and will further, in this embodiment, record the contact address for the requesting router. A prefix offer identifying the selected address prefix will then be sent 38 to the requesting router. When the prefix server 14 determines 39 that the router accepts the new address prefix, the prefix server 14 will again update 40 internal records to indicate the "accepted" state of the selected address prefix for the corresponding router.

When selecting a new address prefix as mentioned above, the prefix server 14 could, if desired, respond with a relatively simple selection process. For example, the prefix server 14 could simply pick a next available address prefix at random, or could pick a next available address prefix in a given sequence. In a preferred embodiment, however, the selection mechanism will serve to create and/or preserve address and route aggregations. ("Aggregation" as used herein simply reflects that at least some portion of the address prefix can be efficiently used to find a route for all addresses sharing that portion of the address prefix as well understood in the art. For example, an aggregated set of routes will tend to have address prefixes that share higher level address bits, and preferably in a nested fashion.)

In this process, the prefix server 14 will ordinarily track, or otherwise have access to, the state of each prefix in its pool or assigned and unassigned address prefixes. In one embodiment, such prefixes may have any of three states: available, offered, or accepted. When a prefix is offered, the prefix server can beneficially track this state so that the particular prefix will not be offered a second time while the first offer is pending. When an offer is made, there is no guarantee that the router will accept it. An offer should therefore preferably have a finite lifetime that is tracked by the prefix server 14. When a corresponding prefix accept message is not received within the lifetime of the offer, the prefix server 14 may, if desired, change the state of the prefix back to "available" (not shown in FIG. 3).

To avoid conflicts, the lifetime of an offer should be long enough such that routers that assign an adequate priority to processing prefix offer messages can return prefix accept messages to the prefix server 14 before expiration of the lifetime. Lifetimes may be statically or dynamically determined, and if the latter, may be based, in part, upon present congestion of the network and other factors that may influence response time.

A communication protocol to support the communications described above between the prefix server 14 and a router could include the following messages:

TABLE 1

| Router → Prefix Server | Prefix Server → Router |
|---|---|
| Prefix Server Solicitation | Solicitation Reply |
| Prefix Request | Prefix Offer |

TABLE 1-continued

| Router → Prefix Server | Prefix Server → Router |
|---|---|
| Prefix Accept | |
| Prefix Renew | Renew ACK |

The prefix server solicitation as described above could be a multicast or anycast message, while all the others can be unicast. If the prefix server 14 is not on a link to which the requesting router is directly connected, then intermediate routers on the path from the new router to the prefix server 14 can be used to relay the prefix server solicitation message in accordance with a well understood message relaying prior art technique such as that specified for DHCP.

The protocol suggested above includes prefix renew and renew ACK messages that would allow for a renewal process that is not described in FIGS. 2 and 3. An accepted prefix could have, if desired, an associated lifetime (for example, as originally given by the prefix server in the prefix offer message), and the router would therefore likely need to attempt to renew the assignment prior to expiration (by sending a prefix renew message), or cease using it and relinquish it back to the prefix server. The renew ACK message could contain a lifetime extension value extending the lease on the accepted prefix. When an accepted prefix expires, the server may change its state back to "available."

Figure 4:
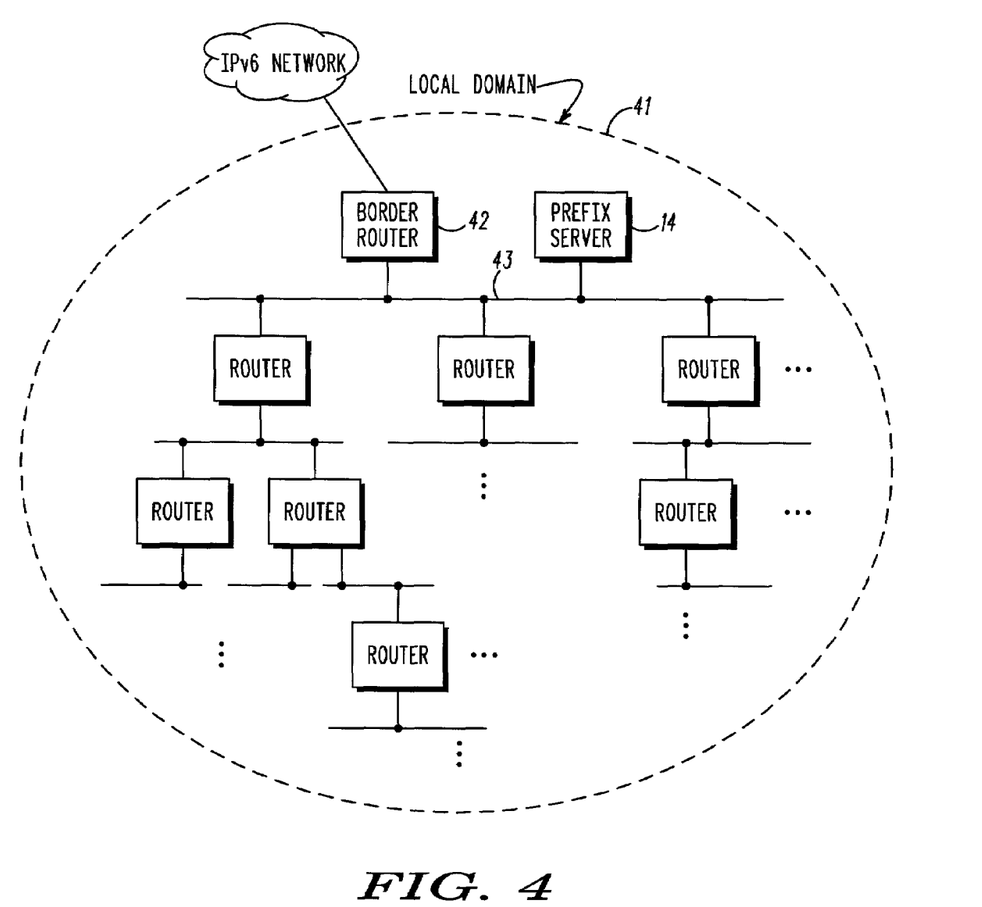
FIG. 4 illustrates an exemplary deployment scenario.

FIG. 4 illustrates an example scenario, where an alternate allocation algorithm could be useful. A local domain network 14 is initialized with the top link having a border router 42 and the prefix server 14 attached. The local domain 41 leases a contiguous N-bit prefix space from an Internet service provider ("ISP"). (Generally, the ISP would assign the most significant 64-N bits of all global IPv6 addresses to be used in the local domain. N bits of the 64-bit prefixes would be under the control of the local domain 41. Often this field would be the N=16-bit SLD ID field defined in RFC2373.) The remaining 64 bits of the 128-bit IPv6 addresses would be used for interface identifiers, usually derived from MAC-layer addresses. The local domain interface of the border router 42 is manually configured with the lowest prefix from this space (all N bits equal to zero) and periodically advertises this prefix on its local domain link 43. The remaining prefixes (the N bits range from 1 to $2^N-1$) constitute the prefix server's pool.

As the elements comprising the local domain network are deployed, the various routers are introduced in an order that is not known a priori. Other nodes (end hosts, access points, servers, and so forth) can be attached to any of the links in the diagram to give the network value as well understood in the art (they are not shown to avoid cluttering the diagram). In accordance with standard practice, each router receives a router advertisement for its top interface from the router above it. By way of contrast, and in accordance with the embodiments taught above, each router obtains prefixes for each of its bottom interfaces from the prefix server 14. Without loss of generality, for purposes of this example, assume that when a router has more than one bottom interface, it obtains prefixes for these interfaces sequentially from left to right.

As the prefix server 14 allocates prefixes from its pool, it will attempt to preserve route aggregation in the network 41. To accomplish this, the prefix server 14 must have at least a partial knowledge of the current router topology of the network 41 each time the allocation selection process is run. The prefix server 14 could obtain this information in any of several ways as appropriate to a given application. The prefix server 14 could query some other network management service that can provide the topology information. The prefix server 14 could trace the route of each prefix request message back to its source address and use the resulting information to infer all or part of the relevant topology. Intermediate routers that forward prefix request messages could add additional information to each message, such as the top interface identifier, so that the prefix server 14 could accumulate topology information directly from the prefix request messages. Or, a method by which the prefix server 14 can deduce topology information from its own internal state information is described in the next paragraph.

When a router requests a prefix for a bottom interface, the source address of the prefix request message will be the address of the requesting router's top interface. The prefix of the source address will be the prefix that has previously been allocated to the bottom interface of the next router in the path towards the prefix server 14. The contact address for the next router's bottom interface prefix will have the prefix of its top interface, which is also the prefix allocated to the bottom interface of yet the next router in the path towards the prefix server 14. In this manner, the prefix server 14 can trace the path from the requesting router to itself until eventually it finds a contact address whose prefix matches the one being advertised by the border router 42, and thus the requesting router's topological location can be deduced.

Figure 5:
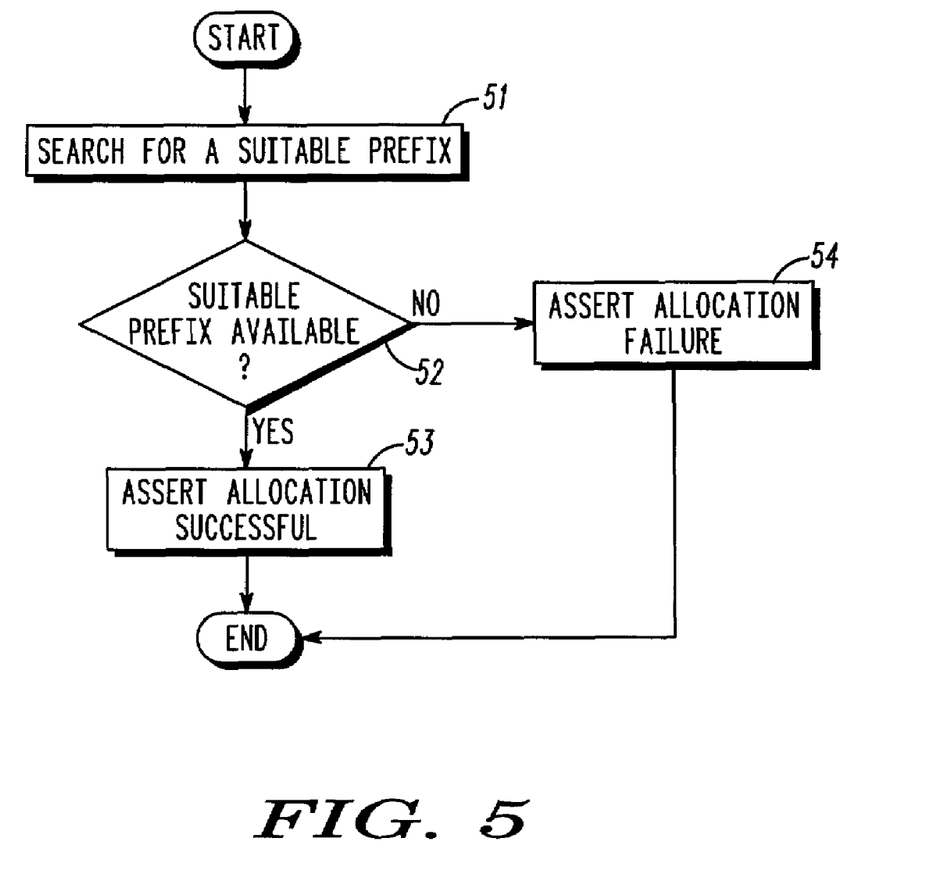
FIG. 5 illustrates one embodiment whereby a prefix server can allocate an address prefix.

FIG. 5 depicts a flow diagram of one exemplary allocation process that the prefix server 14 can use as appropriate to a given application. The prefix server 14 searches 51 for a suitable prefix for a requesting router that is both available for assignment and that will preserve route aggregation. One such search procedure is expressed in the following pseudocode:

```
# function prototypes
function CA(P)
{
  return the contact address of the allocated or offered prefix P
}
function State(P)
{
  return the state of the prefix P (available, offered, or accepted)
}
function Pre(A)
{
  return the prefix of the address A
}
# begin here
Min = Pre(the source address of the Prefix Request message)
CA_Min = CA(Min)
Max = (the highest prefix in the pool) + 1
while(there is another offered or accepted prefix)
{
  Max_temp = the next offered or accepted prefix
  if((Pre(CA(Max_temp)) == Pre(CA_Min)) &
  (Max_temp > Min) & (Max_temp < Max))
  {
    Max = Max_temp
  }
}
Gap = Max − Min
Prefix = −1
i = 2
while((i <= Gap) & (Prefix < 0))
{
  Offset = Gap/i
  Prefix_temp = Min + Offset
  while((State(Prefix_temp) != available) & (Prefix_temp < Max))
  {
    Prefix_temp += 2 * Offset
  }
```

-continued

```
if(State(Prefix_temp) == available)
{
  Prefix = Prefix_temp
}
i *= 2
}
```

At the end of this procedure, the Prefix variable will either be set to the value of a suitable prefix, or it will be negative, meaning no suitable prefix is available. With respect to the illustrated process, the prefix server 14 will determine 52 if a suitable prefix is available. When true, successful allocation can be asserted 53 and when false, allocation failure is asserted 54.

Figure 6:
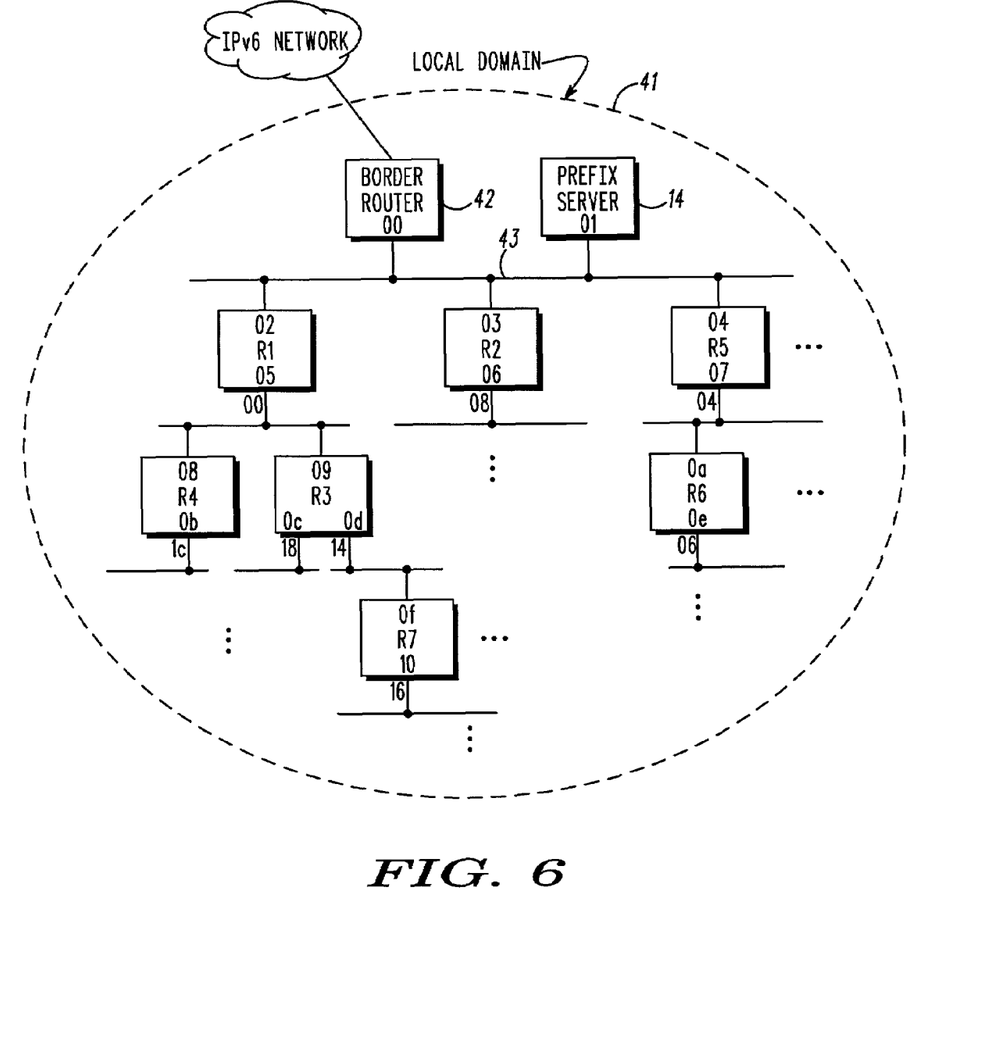
FIG. 6 illustrates another exemplary deployment scenario.

To further illustrate, FIG. 6 depicts the same scenario as described above in FIG. 4, except now the routers are numbered in order of their introduction to the network (sequentially from R1 to R7), and each interface is given an 8-bit identifier in hexadecimal notation inside the router boxes (in IPv6, interface identifiers are typically 64 bits). Also, for purposes of this example, assume that N=5 bits and that these are the 5 least significant bits of the (typically 64 bit) prefix field. The upper bits are constant and not shown in this example. Thus, a complete address has the form PP:NN where PP is the prefix in hex and NN is the interface identifier in hex (note that this notation is only for purposes of illustration and does not itself constitute a part of any particular embodiment of the invention—in particular, this notation is not intended to be consistent with standard IPv6 address notation). Recall that the local domain interface of the border router 42 is manually configured to advertise the 00 prefix. After routers R1 through R7 have been introduced to the network 41, the resulting state information in the prefix server is, in this example:

TABLE 2

| Prefix | Contact Address | State |
|--------|-----------------|-------|
| 10 | 00:02 | Accepted |
| 08 | 00:03 | Accepted |
| 18 | 10:09 | Accepted |
| 14 | 10:09 | Accepted |
| 1c | 10:08 | Accepted |
| 04 | 00:04 | Accepted |
| 06 | 04:0a | Accepted |
| 16 | 14:0f | Accepted |

Each of these prefixes is shown in FIG. 6 as a hex number outside a router box and next to the interface to which it's allocated.

Those skilled in the art will recognize that a wide variety of modifications, alterations, and combinations can be made with respect to the above-described embodiments without departing from the spirit and scope of the invention. For example, a router could be programmed to repeat the process of FIG. 2, either periodically or in response to asynchronous events. This would allow it to update its configuration when a change occurs, such as a new interface being activated or a new prefix server becoming available.

There are several possibilities for handling the case when a router receives solicitation reply messages from more than one prefix server. For example, the protocol could dictate that the router directs all prefix requests to the nearest prefix server. Alternatively, the router could sort the prefix servers according to some criteria (shortest distance, shortest round trip time, and so forth). Then, if a prefix server is unable to fulfill a request, the router could redirect that and all subsequent requests to the next prefix server in the sorted list.

Routers may request, and prefix servers may manage, prefixes of varying scope, e.g. site or global. It may be a good practice to have prefix servers enforce a rule that the scope of a contact address must match the requested prefix scope, by not making an offer when there is a scope mismatch. An error message could also be sent to the requesting router. Otherwise, the prefix pool may become more fragmented than necessary, or the prefix server may have to do extra work to resolve ambiguities.

The protocol could allow a router to bundle several prefix requests into a single message. The prefix server could then also bundle the prefix offers into a single offer message. An offer message might contain as many prefixes as were requested, or fewer if not all of the requests can be accommodated. When a router receives an offer with multiple prefixes, it must somehow decide how to distribute the prefixes among its interfaces. The router could accept the prefix server's decision by matching the order of the offered prefixes to the order of the requests, or the router could implement its own algorithm for prefix distribution. Prefix accept, prefix renew, and renew ACK messages could be bundled as well.

A prefix server could take other information than that mentioned above as input to the allocation selection process (link type, service type, location, and so forth). For example, a prefix server could manage multiple prefix pools, which are allocated for different purposes.

It may be desirable to integrate authentication and/or privacy mechanisms into the system, so that prefixes cannot be stolen and/or routers cannot be misconfigured.

The prefix server could be critical to the operation of the network. For greater reliability, a mechanism could be developed where one prefix server (a hot standby) quickly takes over for another one when the first server fails. This could be similar to mechanisms used for DHCP servers, with the backup server periodically being updated with snapshots of the main server state.

When the search for a suitable prefix fails, a scalable allocation selection process could perform the additional steps of:
  determining if it is possible to renumber some subset (possibly all) of the local domain routers so as to make a suitable prefix available; and
  if so, sending a Wait for Offer message to the requesting router, renumbering the subset accordingly, and then computing the prefix to be offered.

Figure 7:
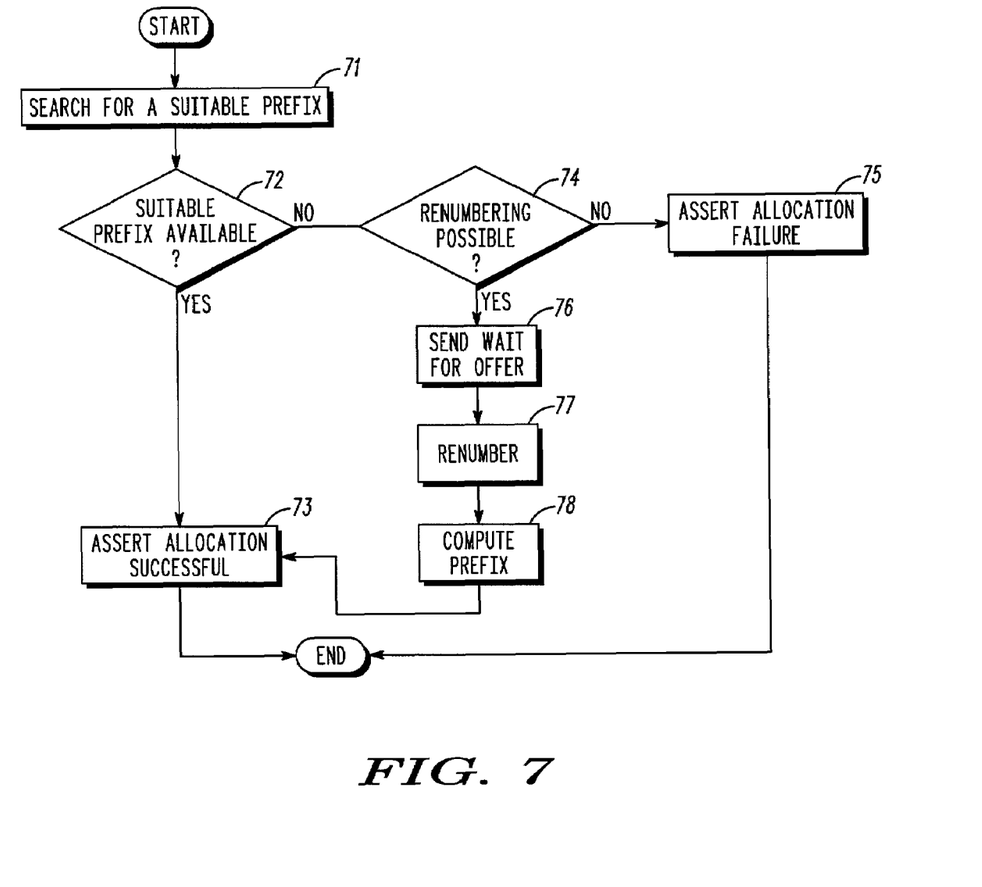
FIG. 7 illustrates another embodiment whereby a prefix server can allocate an address prefix.

The Wait for Offer message would inform the requesting router that renumbering is taking place, so that it can allow extra time before giving up on receiving a Prefix Offer. FIG. 7 illustrates such a process with these enhancements.

Pursuant to the embodiment depicted in FIG. 7, if a search 71 for a suitable address prefix leads to a determination 72 that a suitable prefix exists, a successful allocation can be asserted 73 in accord with earlier described embodiments. If, however, the determination 72 indicates that no suitable prefix is presently available, the prefix server 14 can determine 74 if renumbering any of the existing assigned prefixes is usefully possible. If not, then again a failed allocation can be asserted 75. When renumbering is available as a viable alternative, however, the process can send 76 a wait for offer message to the requesting router and then engage in a renumbering 77 process to reallocate address prefixes in a way that continues to maintain routing aggregation where appropriate while also making available at least one address prefix for the presently requesting router that will, itself, form or maintain routing aggregation with respect to that assignment. The corresponding prefix is then computed 78 and the allocation successfully asserted 73 as before.

The step of renumbering a subset of the routers would of course require that the impacted routers be informed regarding the replacement of their previously allocated prefixes with different ones. For each prefix being replaced, the prefix server could contact the appropriate router using the contact address for the prefix. There are various ways in which a specific renumbering could be effected. The method described in IETF RFC 2894 could be implemented, in whole or in part, in such an approach if desired.

It might be desirable for a prefix server to be able to cope with the introduction of routers in a local domain that do not fully participate in the protocol. If a non-participating router's prefixes are not from the server pool, then the prefix server may be able to collapse or ignore it in the topology. If a non-participating router is using prefixes from the server pool, then the prefix server could note this and try to renumber the network to accommodate the situation. The desire to cope with non-participating routers may also impact the choice of method that the prefix server uses for learning the network topology.

All of the above modifications, alterations, and combinations are to be viewed as being within the ambit of the inventive concept along with such other modifications, alterations, and combinations as will naturally occur to those skilled in these arts.

We claim:

1. A method comprising:
   providing a prefix server having a plurality of address prefixes for use within at least a portion of a communications network;
   receiving over the communications network and at the prefix server a communication from a router;
   in response to the communication from the router, using the prefix server to assign at least a single address prefix from the plurality of address prefixes; and
   sending over the communications network a communication to the router containing at least a single address prefix causing the router to advertise at least the single address sent by the prefix server for use by endpoints attached to the router.

2. The method of claim 1 wherein using the prefix server to assign at least a single address prefix from the plurality of address prefixes for subsequent use with and by the router includes selecting at least a particular address prefix based at least in part upon a topological location of the router within the communications network.

3. The method of claim 2 wherein selecting at least a particular address prefix based at least in part upon a topological location of the router within the communications network includes inferentially determining the topological location of the router within the communications network.

4. The method of claim 2 wherein selecting at least a particular address prefix based at least in part upon a topological location of the router within the communications network includes accessing explicit information regarding the topological of the router.

5. The method of claim 3 wherein inferentially determining the topological location of the router within the communications network includes accessing information regarding previous assignments of address prefixes within the communications network.

6. The method of claim 1 wherein receiving over the communications network and at the prefix server a communication from a router includes receiving over the communications network and at the prefix server a communication comprising a request for at least one prefix assignment from the router.

7. The method of claim 1 wherein using the prefix server to assign at least a single address prefix from the plurality of address prefixes for subsequent use with and by the router includes using the prefix server to assign at least a single address prefix from the plurality of address prefixes for subsequent use with and by the router as a function at least in part of a routing aggregation that includes a route that passes through the router.

8. The method of claim 7 wherein using the prefix server to assign at least a single address prefix from the plurality of address prefixes for subsequent use with and by the router as a function at least in part of a routing aggregation that includes a route that passes through the router further includes using the prefix server to assign at least a single address prefix from the plurality of address prefixes for subsequent use with and by the router as a function at least in part of a routing aggregation that includes a route that passes through the router and at least one other route that passes through to another router.

9. The method of claim 1 and further comprising using, the router, at least the single address prefix.

10. The method of claim 1 wherein the step of sending over the communications network a communication to the router containing at least a single address prefix causing the router to advertise at least the single address prefix sent by the prefix server for use by endpoints attached to the router, comprises the step of sending over the communications network a communication to the router containing at least a single address prefix causing the router to advertise at least the single address prefix sent by the prefix server for simultaneous use by multiple endpoints attached to the router.

11. A method for operating a prefix server, the method comprising the steps of:
    receiving a communication from a communication unit;
    retrieving from the communication an address that corresponds to the communication unit;
    determining that the communication unit requires at least one additional address prefix;
    determining a topology position of the communication unit within a communications network as a function, at least in part, of the address;
    selecting at least one additional address prefix as a function, at least in part, of the topology position; and
    sending a communication to the communication unit, the communication containing at least a single address prefix which causes the communication unit to advertise at least the single address prefix for use by endpoints attached to the communication unit.

12. The method of claim 11 and further comprising assigning the at least one additional address prefix to the communication unit.

13. The method of claim 11 wherein receiving a communication from a communication unit includes receiving a request for at least one address prefix from a router.

14. The method of claim 11 wherein determining a topology position of the communication unit within a communications network as a function, at least in part, of the address includes determining a topology position of the communication unit within a communications network as a function, at least in part, of the address, previously retrieved addresses, and previously assigned address prefixes as assigned within the communications network.

15. The method of claim 11 wherein selecting at least one additional address prefix as a function, at least in part, of the topology position includes selecting at least one additional address prefix that will aggregate a route that passes through to the communication unit with at least one other a route that passes through to another communication unit with respect to topology of the communications network.

16. The method of claim 11 wherein selecting at least one additional address prefix as a function, at least in part, of the topology position includes selecting at least one additional address prefix to balance, at least in part:

facilitating both aggregation of a route that passes through to the communication unit with at least one other a route that passes through to another communication unit with respect to topology of the communications network;

against:

potential future needs to select other address prefixes to also facilitate aggregation of other routes with respect to topology of the communications network.

17. The method of claim 11 wherein the step of sending a communication to the communication unit, the communication containing at least a singe address prefix which causes the communication unit to advertise at least the single address prefix for use by endpoints attached to the communication unit comprises the step of sending a communication to the communication unit, the communication containing at least a single address prefix which causes the communication unit to advertise at least the single address prefix for simultaneous use by multiple endpoints attached to the communication unit.

18. A method comprising:

providing a prefix server having a plurality of address prefixes for use within at least a portion of a communications network;

automatically maintaining a record of assigned address prefixes and topological locations within the communications network to which the address prefixes have been assigned;

automatically determining that at least one new address prefix from the plurality of address prefixes should be assigned for use by a specific communications unit within the at least a portion of a communications network;

automatically selecting the at least one new address prefix as a function, at least in part, of:

facilitating topological aggregation of a route that passes through to the specific communications unit via the new address prefix; and ensuring, when possible, that the new address prefix is at least not sequentially adjacent to another address prefix that is already assigned.

19. The method of claim 18 wherein ensuring, when possible, that the new address prefix is at least not sequentially adjacent to another address prefix that is already assigned includes ensuring that the new address prefix is selected so as to maximize a minimum of a set of absolute values of numerical differences between the new address prefix and all known prefixes that have already been assigned.

* * * * *

UNITED STATES PATENT AND TRADEMARK OFFICE
CERTIFICATE OF CORRECTION

| | | |
|---|---|---|
| PATENT NO. | : 7,454,519 B2 | |
| APPLICATION NO. | : 10/104862 | |
| DATED | : November 18, 2008 | |
| INVENTOR(S) | : Aaron N. Smith et al. | |

It is certified that error appears in the above-identified patent and that said Letters Patent is hereby corrected as shown below:

ON THE TITLE PAGE

1. On Page 2, Item (56), under "OTHER PUBLICATIONS", Lines 1-3, delete "Peter Loshin, "IPv6 Clearly Explained,"……173-181.".
(Repeated Entry)

2. On Page 2, Item (56), under "OTHER PUBLICATIONS", Lines 4-7, delete "Ralph Droms and Ted Lemon,……Lemon, III, p. 68.".
(Repeated Entry)

3. On Page 2, Item (56), under "OTHER PUBLICATIONS",
Lines 8-9 and Lines 1-2, delete "Sidarth Ambardar and Walter Lazear,……31-34.".
(Repeated Entry)

4. On Page 2, Item (56), under "OTHER PUBLICATIONS", Lines 3-5, delete "S. Deering and…..Dec. 1998).".
(Repeated Entry)

5. On Page 2, Item (56), under "OTHER PUBLICATIONS", Lines 6-7, delete "T. Narten et al.,………………….Dec. 1998).".
(Repeated Entry)

6. On Page 2, Item (56), under "OTHER PUBLICATIONS", Lines 8-10, delete "S. Thomson and T. Narten,……………………Dec. 1998).".
(Repeated Entry)

UNITED STATES PATENT AND TRADEMARK OFFICE
CERTIFICATE OF CORRECTION

PATENT NO. : 7,454,519 B2
APPLICATION NO. : 10/104862
DATED : November 18, 2008
INVENTOR(S) : Aaron N. Smith et al.

It is certified that error appears in the above-identified patent and that said Letters Patent is hereby corrected as shown below:

7. In Fig. 3, Sheet 3 of 7, for Tag "37", Line 1, delete "PERFIX" and insert -- PREFIX --, therefor.

8. In Fig. 3, Sheet 3 of 7, for Tag "37", Line 2, delete "AONTACT" and insert -- CONTACT --, therefor.

9. In Column 5, Line 29, delete "scenario," and insert -- scenario --, therefor.

10. In Column 9, Line 59, in Claim 4, after "topological" insert -- location --.

11. In Column 10, Line 23, in Claim 9, after "using," insert -- at --.

12. In Column 11, Line 23, in Claim 17, delete "singe" insert -- single --, therefor.

Signed and Sealed this

Eleventh Day of August, 2009

David J. Kappos
*Director of the United States Patent and Trademark Office*